United States Patent [19]

Schott

[11] 3,868,193
[45] Feb. 25, 1975

[54] COLLAR
[75] Inventor: Donald E. Schott, Emerson, N.J.
[73] Assignee: Thomas C. Wilson, Inc., Long Island City, N.Y.
[22] Filed: June 13, 1972
[21] Appl. No.: 262,373

[52] U.S. Cl. .............................. 403/344, 24/135 R
[51] Int. Cl. ................................................ F16d 1/06
[58] Field of Search........ 287/110, 111, 52.03, 52 R, 287/52.07, 52.04, 52.08; 403/344; 24/135 R

[56] References Cited
UNITED STATES PATENTS

| | | | |
|---|---|---|---|
| 1,888,669 | 11/1932 | Hossfeld............................ | 24/135 R |
| 2,287,343 | 6/1942 | Duda................................. | 287/52.03 |
| 2,787,483 | 4/1957 | Harvey et al. .................... | 287/52.06 |
| 3,127,784 | 4/1964 | O'Neill............................... | 227/52 R |
| 3,598,432 | 8/1971 | Walker .............................. | 287/52.04 |
| 3,680,404 | 8/1972 | Firth .................................. | 287/52.08 |

Primary Examiner—Andrew V. Kundrat
Attorney, Agent, or Firm—Pennie & Edmonds

[57] ABSTRACT

A collar intended for clamping around a longitudinal cylindrical member having a first pair of opposed sections defining a cylindrical inner opening for accepting the cylindrical member. At least one section is divided at its center by a radial extending gap, and a second pair of intermediate opposed sections of the flange connect the first pair of opposed sections. When the segments of the arcuate section are brought together by a fastening means extending across the radial extending gap, the collar is clamped around the cylindrical member. The second pair of intermediate opposed sections have a lesser cross-sectional area than the first pair of opposed sections so as to facilitate improved bending flexibility for increased clamping contact area and improved clamping action on the cylindrical member.

8 Claims, 5 Drawing Figures

PATENTED FEB 25 1975 3,868,193

COLLAR

BACKGROUND OF THE INVENTION

1. Field of the Invention

This invention relates to improvements in clamp-type collars which are intended for clamping on cylindrical members and have improved clamping engagement force distribution so as to provide an assembly which can withstand substantial axial forces without slippage of the collar.

2. Description of the Prior Art

Modern locking or clamping devices include an internally threaded nut type member or a clamp-type collar device having a C-shaped configuration which defines an inner opening through which a cylindrical shaft-like member may be inserted. The clamp-type collar generally has two arcuate half sections of equal cross-sectional thickness connected at one end and open at the other end with a radial gap between spaced-apart open-end portions. The arcuate half sections define an inner circular opening while at the connected end some material is removed such that the intermediate section connecting the arcuate half sections opposite the radial gap has a radial slot extending partially through the wall of the flange. This slot provides bending flexibility over a limited portion of the flange. When a fastening means such as a clamping screw or bolt is rotatably inserted into a generally tangentially disposed internally threaded opening at the open-end portions of the collar, the open-end portions of the arcuate sections tend to advance toward each other along the threaded portion of the screw. This, in turn, causes the two half sections to advance toward each other to effectively reduce the average diameter of the inner opening of the clamping collar such that the collar clampingly engages the outer surface portion of the cylindrical member.

These clamp-type collars develop their maximum clamping or resistance to "thrust loading" when the difference between the shaft diameter and the bore diameter in the collar approaches zero. However, such minimum clearance conditions are not readily obtainable or even practical under certain circumstances. For example, when the clearance between the shaft and the clamp exceeds a few thousandths, the capacity of the clamp to resist thrust loads is seriously deteriorated. In addition, practically all of the deformation of these clamp-type collars occurs in the wall portion of the flange contiguous with the partial radial slot opposite the radial extending gap. The relatively rigid arcuate sections do not deform sufficiently and the actual contact of the collar with the shaft occurs in a relatively narrow area.

Such collars are suitable only in applications where the anticipated axial forces or "thrust loads" are not excessive. However, where the thrust loads approach several hundreds of pounds, the clamping engagement capability has been found to be unsatisfactory. One example of such an application is when they are used with Tube Expanders of the type described in my U.S. Pat. No. 3,426,565. When the collar half sections are clamped by a clamping device, the relatively rigid arcuate half sections of the collar do not deform sufficiently or uniformly along the curved portions as described above. The clamping engagement forces are concentrated in relatively narrow area segments of the surface of the cylindrical member. This unsatisfactory clamping engagement results in relative movement and slippage of the collar with respect to the shaft under high thrust loads. To replace such a clamping collar with a threaded type locking member is not desirable in such instances. Clamp-type collars not only provide a rapid and infinitely variable adjustment, but they eliminate the need for the thread on the shank of expanders as described in my above-noted patent. In such cases with threaded collars and a thread on the shank of the expander, the thread could rub against, and damage the inner diameter of a tube while it is being expanded. Thus it is desirable to use clamp-type collars which are capable of withstanding substantially greater forces which would otherwise tend to slip the collar on the cylindrical member.

I have invented an improved clamp-type collar which is capable of sustaining higher thrust loads than the clamping collars of the prior art due to improvements which facilitate increased clamping engagement area and improved clamping between the collar and the cylindrical member. The collar has excellent clamping capability where prior collars of this type were not satisfactory. It has particularly good clamping capability even where excessive variations exist between the shaft and the diameter of the cylindrical opening of the collar.

SUMMARY OF THE INVENTION

The present invention relates to improvements in collars having a flange defining a substantially cylindrically-shaped inner surface so as to define an axial opening which receives a longitudinal cylindrical member of lesser diameter therein for clamping thereon. The improvement in the collar comprises a first pair of opposed sections of substantially equal cross-sectional area, each having a substantially cylindrical inner surface portion, and an outer surface substantially concentric with the inner surface of the section. The flange includes a radial extending gap dividing at least one of the first opposed sections at its center to define at least two segments having opposed end faces of the collar. A second pair of intermediate opposed sections of the flange connect the first opposed sections and have cylindrical inner surfaces of equal diameter to the inner surfaces of the first sections and are contiguous thereto to define the substantially cylindrical inner surface. The second intermediate opposed sections have a lesser cross-sectional area than the first pair of opposed sections. At least one fastening means interconnects the segments of the divided section at the radial extending gap in a manner which produces movement of the segments of the section toward and away from each other so as to vary the average diameter of the cylindrical inner surface for clamping the collar around a cylindrical member. The lesser cross-sectional area of the intermediate opposed sections facilitates improved bending flexibility of those sections such that the clamping engagement contact area between the collar and the cylindrical member is substantially increased in comparison to the collars of the prior art. With such increased contact area the clamping engagement is improved with the result that the clamping forces are uniformly distributed and the assembly is capable of withstanding higher axial forces without slippage of the collar.

BRIEF DESCRIPTION OF THE DRAWING

A preferred embodiment of the invention is described hereinbelow with reference to the drawings wherein.

Figure 1:
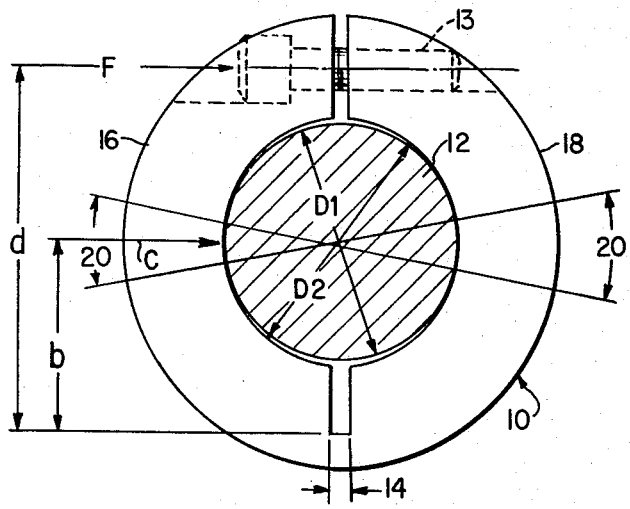
FIG. 1 is a front elevation of the clamp-type collar of the prior art showing the limited contact area between the collar opening and the cylindrical member.
Figure 2:
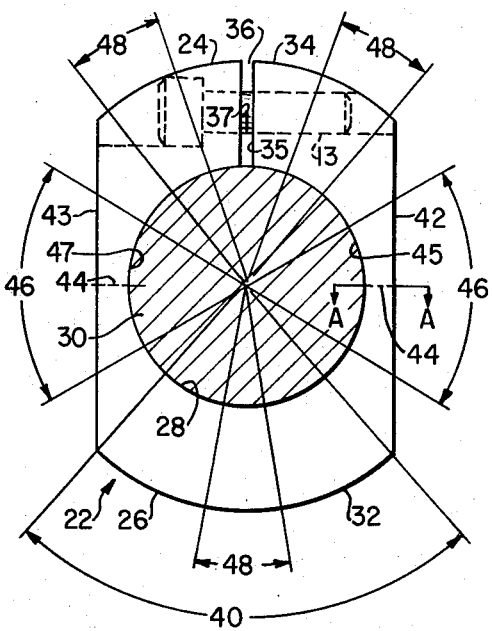
FIG. 2 is a front elevation of the improved collar of the present invention.
Figure 3:
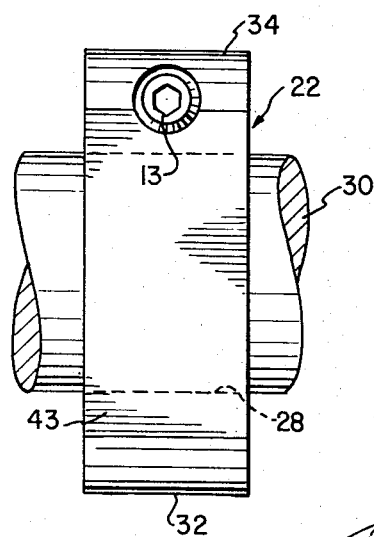
FIG. 3 is a side elevation of the improved collar of the present invention.

Referring to the drawings, there is shown in FIG. 1 a clamp-type collar 10 of the prior art. Such collars may be of a metal or metal alloy such as carbon steel, stainless steel, aluminum, aluminum alloy, MONEL metal and the like. When the split collars of this type are fitted around a cylindrical shaft 12, the maximum clamping and corresponding resistance to slippage due to axial forces sometimes referred to as "thrust loads," occur when the difference between the shaft diameter D1 and the average diameter D2 of the opening approaches zero. However, such minimum conditions are not readily obtainable or even practical under certain circumstances. For example, when the clearance between the shaft 12 and the surface of the inner opening of the clamp exceed a few thousandths of an inch, the capacity of the clamp to resist thrust loads rapidly deteriorates. The collars of the type shown in FIGS. 1 and 2 are deformed by a force F as shown, which is provided by a fastening means such as the threaded clamping screw 13. For the collar shown in FIG. 1, practially all of the deformation of the flange occurs in the narrow arc 14. Due to the relative stiffness of the arcuate sections 16 and 18 of the collar as shown, the actual contact of the collar with the shaft occurs in the relatively narrow area portions defined by arcs 20 in FIG. 1. The clamping force exerted along the arrow C in FIG. 1 is substantially equal to:

$$C = F \times b/d$$

where the clamping force F is the force exerted by the fastening means 13 and the dimensions b and d are as shown in FIG. 1. Dimension $b$ is the distance from the arc of bending flexibility 14 to the fastening force line F.

In theory the resistance to axial displacement would then be equal to the product:

$$C \times \text{coefficient of friction}$$

In practice C is great enough to make axial movement dependent on the shear strength of the shaft or clamp material in contact.

Figure 4:
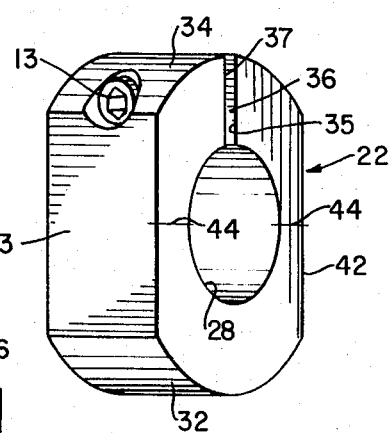
FIG. 4 is a perspective view of the improved collar of the present invention.

Referring to FIG. 2 the improved collar 22 is comprised of a flange 22 which includes two arcuate sections 24 and 26 having substantially equal cross-sectional area or thickness as shown. The arcuate sections 24 and 26 define portions of a substantially cylindrically-shaped axial inner opening 28, which receives a longitudinal cylindrical member 30, of a lesser diameter therein for clamping engagement thereon. The arcuate sections 24 and 26 have outer surfaces such as shown at 32 and 34 in FIG. 2, which are curved and are substantially concentric with the surface of the inner opening 28. The flange includes the radial extending gap 36 which divides one arcuate section 24 at its center to define two opposed segments having end faces 35 and 37 of the collar. The end faces extend in a plane generally parallel to a vertical plane passing through the center of the gap 36 and the center of the cylindrical member 30 as shown in FIG. 2. Referring further to FIG. 2 there is shown intermediate opposed sections 42 and 43 which connect the arcuate sections. The intermediate sections have flat outer surfaces as shown in FIGS. 2 and 4, and cylindrical inner surfaces 45 and 47 of equal diameter to the inner surfaces of the arcuate sections 24 and 26. The cylindrical inner surfaces of the opposed intermediate sections are substantially contiguous with the inner surfaces of the arcuate sections and define the cylindrical inner opening 28 together with those sections. The flat outer surfaces are substantially parallel to each other and thereby define opposed sections of the flange having an arch-shaped cross-sectional configuration each having a minimum cross-sectional thickness spaced approximately 180 degrees from the other. These portions have a minimum cross-sectional area as viewed along section A—A in FIG. 2. In addition, it can be seen that the intermediate opposed sections 42 and 43 have a lesser cross-sectional area than the first pair of opposed sections as viewed along any section parallel to section A—A in FIG. 2.

The flat outer surfaces are also parallel to the open-end faces of the divided arcuate section. When a fastening means such as the clamping screw 13 produces movement of the open segments of the arcuate section 24 toward each other, the average diameter of the flange inner opening is reduced to provide clamping engagement with the surface of the cylindrical member 30. The improved bending flexibility of the flange at the portions having a minimum cross-sectional area 44 as shown, provides increased uniform distortion of the flange and an increased clamping engagement contact area between the clamp inner opening 28 and the cylindrical member 30. The portions 44 having a minimum cross-sectional area preferably have a tensile strength substantially equivalent to the clamping force F provided by the clamping screw 13. This provides maximum bending of the collar flange with maximum clamping contact area.

The relatively rigid arcuate sections 24 and 26 are preferably about three times as thick as the flexible portions 44 of the intermediate opposed sections. Also, the first pair of arcuate sections preferably extend over opposed quadrants of the collar including a range of up to 90 degrees of arc as represented by the arc 40 shown only with reference to the lower arcuate section 26 in FIG. 2.

The improved collar shown in FIG. 2 has a capacity to resist substantial thrust loading, even though there may be an initial clearance between the shaft diameter and the diameter of the inner surface portion 28 defining the cylindrical opening of the collar due to the increased area of contact which is possible with the flexible intermediate sections of the collar. In addition, all other factors being equal, the surface finish of the shaft will determine the load level at which the collar will slip. For example, a rougher finish will require a higher load. However, to slip the present improved collar, a higher load will be required due to the improved clamping contact with the shaft. Movement of the collar under load may also result in shearing of the metals in contact. Thus it can be seen that with an increase in contact area there is an increase in the metal which must be sheared to move the collar and a higher load required to slip my improved clamp-type collar.

The increased flexibility of the flange at the positions of the minimum cross-sectional area or thickness at 44, is illustrated by the primary areas of contact shown by arcs 46 between the inner surface 28 of the collar 22 and the surface of the cylindrical member 30. The narrow area segments are shown by arcs 48. The contact area of the collar shown in FIG. 2 is particularly contrasted to the primary areas of contact provided by the collars of the prior art as shown in FIG. 1 by the area segments represented by the arcs 20.

Figure 5:
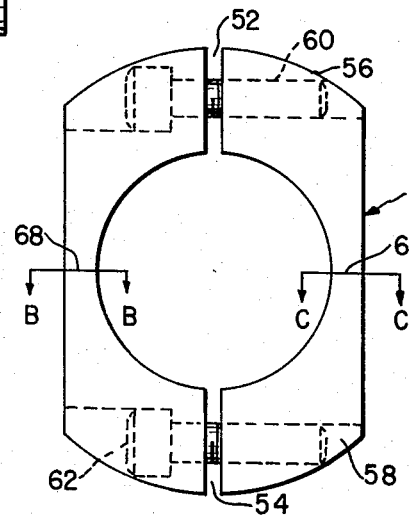
FIG. 5 is a side elevation of a second embodiment of the invention.

Referring to FIG. 5 there is shown a second embodiment of the invention in which the clamp comprises a flange 50 having radial extending gaps 52 and 54 in each of the arcuate sections 56 and 58. The gaps define two pairs of spaced segments having oppositely positioned open-end faces. When the dual clamping screws 60 and 62 produce movement of the open-end faces of the segments of each divided arcuate section toward each other, the improved uniform bending flexibility of the opposed intermediate portions of lesser cross-sectional area 64 and 68, as viewed along section B—B and C—C, combined with the opposed uniform clamping forces, facilitates improved clamping engagement contact area of the flange 50 on the cylindrical member. The additional symmetry provided by the configuration using the dual clamping screws 60 and 62 renders the flange capable of improved uniformly distributed flexibility, with substantial clamping engagement contact area.

I claim:

1. In a clamping collar providing a flange defining a substantially cylindrical-shaped inner surface so as to define an axial opening configured to receive a longitudinal cylindrical member of lesser diameter therein on which the collar is to be clamped, the improvement in said flange comprising:
   a. a first pair of opposed sections of substantially equal width and cross-sectional area and of a material capable of flexing when sufficient bending forces are applied thereto, each having a substantially cylindrical inner surface portion and an outer surface portion substantially concentric with the inner surface portion of said section;
   b. a radial extending gap dividing at least one of said sections at its center and extending over the entire width of the collar to define at least two segments having opposed end faces of the collar;
   c. a second pair of intermediate opposed sections of said flange connecting said first opposed sections, said intermediate sections having substantially cylindrical inner surface portions of equal diameter to the inner surface portions of the first sections and contiguous thereto to define said substantially cylindrical inner surface, said second intermediate opposed sections each being of a material capable of flexing when sufficient bending forces are applied thereto, and having a lesser cross-sectional area than said first pair of opposed sections and each having a bending flexibility which is greater than the bending flexibility of the first pair of opposed sections due to the lesser crossSectional area; and
   d. at least one fastening means interconnecting said segments of said divided section, said fastening means extending from within the circumferential boundary of one segment of the divided section into a portion of and within the circumferential boundary of the other segment of the divided section and being threadedly engaged therweith so as to adapt it to produce movement of the segments toward each other to provide substantial clamping engagement of the collar around the cylindrical member when the segments are moved toward each other, and relaxing of the clamping engagement when the segments are allowed to move away from each other, such that the improved bending flexibility of said flange portions of lesser cross-sectional area facilitates improved uniform bending of said flange and increased clamping engagement contact between the substantially cylindrical inner surface of the collar and the longitudinal cylindrical member and the clamping forces of the collar are sufficient to transmit substantial axial forces between the collar and the cylindrical member independent of rotational forces transmitted thereby providing improved surface to surface clamping of said collar on the cylindrical member.

2. The improved collar according to claim 1 wherein the first pair of opposed sections have a generally arcuate configuration and the intermediate opposed sections of said flange have flat outer surfaces substantially parallel to each other thereby defining opposed sections having an arch-shaped cross-sectional configuration each having its minimum cross-sectional area spaced approximately 180 degrees from the other.

3. The improved collar according to claim 2 wherein the tensile strength of the portions of said flange having a minimum cross-sectional area is substantiallly equivalent to the force provided by said fastening means for moving the segments of said divided arcuate section toward each other.

4. The improved collar according to claim 3 wherein the first opposed arcuate sections having greater cross-sectional area extend over opposed quadrants of said flange comprising approximately 90 degrees.

5. The improved collar according to claim 1 wherein each of said first pair of opposed sections have a radial extending gap dividing them at their centers to define at least two pairs of spaced segments having oppositely positioned end faces and a fastening means interconnects the segments of each section such that when each fastening means produces approximately equal movement of the segments of each section toward each other to provide clamping engagement of the collar around the cylindrical member, the improved bending flexibility of said flange portions of lesser cross-sectional area, combined with the equal and opposed fastening forces, facilitates improved clamping engagement contact area thereby providing uniform and improved clamping of said collar on the cylindrical member.

6. The improved collar according to claim 5 wherein the first pair of opposed sections have a generally arcuate configuration and the intermediate opposed sections of said flange have flat outer surfaces substantially parallel to each other thereby defining opposed sections having an arch-shaped cross-sectional configuration each having its minimum cross-sectional area spaced approximately 180 degrees from the other.

7. The improved collar according to claim 6 wherein the tensile strength of the portions of said flange having a minimum cross-sectional area is substantially equivalent to the force provided by said fastening means for moving the segments of said divided arcuate section toward each other.

8. The improved collar according to claim 7 wherein the first opposed arcuate sections having greater cross-sectional area extend over opposed quadrants of said flange comprising approximately 90 degrees.

* * * * *